United States Patent [19]

Yabe et al.

[11] Patent Number: 4,821,050
[45] Date of Patent: Apr. 11, 1989

[54] OPTICAL INFORMATION RECORDING MEDIUM

[75] Inventors: Masao Yabe; Yonosuke Takahashi, both of Shizuoka, Japan

[73] Assignee: Fuji Photo Film Co., Ltd., Kanagawa, Japan

[21] Appl. No.: 75,266

[22] Filed: Jul. 17, 1987

Related U.S. Application Data

[63] Continuation of Ser. No. 819,326, Jan. 16, 1986, abandoned.

[30] Foreign Application Priority Data

Jan. 16, 1985 [JP] Japan ..................... 60-5538

[51] Int. Cl.$^4$ .................. G01D 15/34; B32B 7/12
[52] U.S. Cl. .................. 346/137; 346/135.1; 427/54.1; 427/162; 428/64; 428/65; 428/694; 430/945; 369/284; 369/288
[58] Field of Search ............ 346/135.1, 137; 427/54.1, 162; 428/694, 64, 65; 430/945; 369/284, 288

[56] References Cited

U.S. PATENT DOCUMENTS 4,434,429  2/1984  Terao et al. ............ 346/135.1
4,499,477  2/1985  Davies et al. ............ 346/137

*Primary Examiner*—E. A. Goldberg
*Assistant Examiner*—Gerold E. Preston
*Attorney, Agent, or Firm*—Sughrue, Mion, Zinn, Macpeak & Seas

[57] ABSTRACT

An optical information recording medium of two disc substrates, which are adhered directly or through a convex portion formed on at least one of the substrates or a spacer provided between the substrates by an adhesive layer, and a recording layer which is capable of recording and/or reading information by laser beam and which is provided on a surface of at least one of the substrates facing the other substrate, wherein the adhesive layer is formed by an ultraviolet-curing epoxy adhesive composition comprising a light-initiator which produces a cationic polymerization initiator upon irradiation with ultraviolet rays and an epoxy compound having two or more epoxy groups per molecule.

15 Claims, 1 Drawing Sheet

OPTICAL INFORMATION RECORDING MEDIUM

This is a continuation of application Ser. No. 06/819,326, filed Jan. 16, 1986, now abandoned.

FIELD OF THE INVENTION

The present invention relates to an optical information recording medium which can write and/or read information by high energy density laser beams. The present invention is adapted for use in various optical disc embodiments, such as video disc, audio disc, large capacity still picture file, and large capacity computer disc memory.

BACKGROUND OF THE IVNENTION

In an optical information recording medium information is written or read by irradiating a recording layer with a light beam through a lens having a focal depth of several micron meters. However, if the recording layer has dust thereon or flaws when handled, it will cause some defects such as bit errors and dropouts. In order to avoid these defects, a so-called air sandwich construction has been proposed which comprises two sheets of disc-shaped plates which are bonded to each other with an adhesive with protrusions provided thereon or spacers interposed therebetween, and at least one of which is a transparent plate having a recording layer provided on the inner surface thereof, as described in U.S. Pat. Nos. 4,074,282, 4,264,911 and 4,353,767. Furthermore, a so-called lamination constructionhas been proposed which comprises two sheets of disc-shaped plates at least one of which is provided with a recording layer, which plates are laminated with each other directly or with a third plate interposed therebetween in such a manner that the recording layer is positioned inside, as described in Japanese patent application (OPI) Nos. 130243/83, 133532/82, 63039/84, 68849/84 and 68850/84.

As an adhesive therefor, there has been commonly used adhesives made of photopolymerizable compounds such as ultraviolet-curing adhesives which take as short period of time, such as several seconds to several minutes, to bond the materials, as described in Japanese patent application (OPI) Nos. 164455/82, 133532/82 and 120243/82, and thus do not require any heating process which might deform the materials.

However, these conventional ultraviolet-curing adhesives are disadvantageous in that they do not exhibit sufficient durability with glass and plastic plates under the circumstances of high temperature and humidity. These conventional ultraviolet-curing adhesive also are unsatisfactory for bonding plates made of acrylic resin or plastic material such as vinyl polychloride and polycarbonate, in that the areas of the materials thus bonded can easily be detached from each other under the slightest deformation of the disc.

In order to improve the adhesivity of such adhesives to the material, it has been proposed that the adherent surface of the material be roughened as disclosed in Japanese patent application (OPI) Nos. 138064/82 and 120243/82. However, this solution is very disadvantageous in that such a roughening process produces dusts which tend to attach to the surface of the material and must be removed therefrom with pure water which has been prepared by a water purifier. Furthermore, the plates thus water-washed must be dried by a clean drier. Thus, this roughening process is disadvantageous in that a costly facility investment and a complicated procedure must be undertaken simply for an improvement in the adhesivity of the adhesive to the material.

Alternatively, it has been proposed that the plates be subjected to discharging treatment or irradiation with ultraviolet rays and then bonded to each other with an electromagnetic radiation-curing adhesive, assuring a greatly improved adhesivity of the adhesive to the material, as disclosed in Japanese patent application (OPI) No. 198548/84. However, this solution is disadvantageous in that it requires a surface treatment process.

Moreover, if an epoxy adhesive is used, a problem arises that amines used as curing agents will deteriorate the recording layer, causing some defects upon recording or reading information. Also, since an epoxy adhesive takes a long time to cure, the plates have to be fixed for a long period of time, until the curing is finished, upon assembly of discs, so that a slightest deviation from the predetermined position can be avoided, which adds to complication of the production process.

SUMMARY OF THE INVENTION

Therefore, an object of the present invention is to provide an optical information recording medium having two disc substrates (plates) which can be prevented from being detached from each other at the bonded areas due to aging or upon deformation.

Another object of the present invention is to provide an optical information recording medium whose assembly process requires no surface treatment of substrates.

A further object of the present invention is to provide an optical information recording medium free of deterioration of a recording layer due to an adhesive.

A still further object of the present invention is to provide an optical information recording medium which can be rapidly assembled.

These objects of the present invention are accomplished by an optical information recording medium comprising two disc substrates, which are adhered directly or through a convex portion (protrusion) formed on at least one of the substrates or a spacer provided between the substrates by an adhesive layer, and a recording layer which is capable of recording and/or reading information by laser beam and which is provided on a surface of at least one of the substrates facing the other substrate, wherein the adhesive layer is formed by an ultraviolet-curing epoxy adhesive composition comprising a light-initiator which produces a cationic polymerization initiator upon irradiation with ultraviolet rays and an epoxy compound having two or more epoxy groups per molecule.

DETAILED DESCRIPTION OF THE INVENTION

The construction of the optical information recording medium may include a construction such that two substrates, at least one of which is provided with a recording layer facing inside, are engaged by the adhesive layer, and a so-called "air sandwich construction" wherein two substrates, at least one of which is provided with a recording layer facing the other substrate, are engaged by the adhesive layer through a convex portion (annular protrusion) formed on the substrate(s) or a spacer provided between the two substrates so that a sealed space between the substrates is formed.

In the optical recording information medium having the above described constructions, as laser light passing through a substrate impinges on the surface of the recording layer which is out of contact with the air for recording or playback of information, the recording layer is free from receiving physical and chemical damages, and from dirt adhering on the surface of the recording layer, which may interfere with recording and playback.

Figure 1:
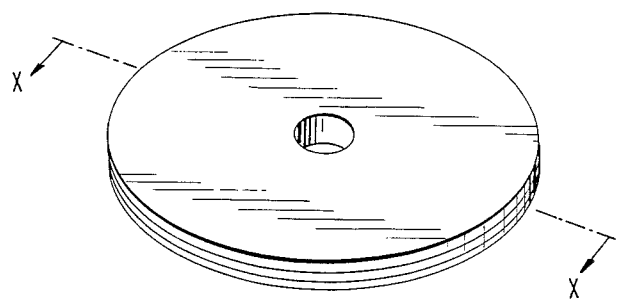
FIG. 1 is a perspective view showing one embodiment of an information recording medium having an air sandwich construction.
Figure 2:
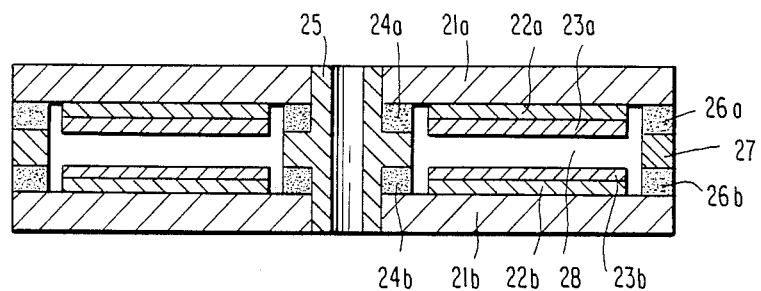
FIG. 2 is a cross-sectional view of FIG. 1 cut along X-X line in FIG. 1.

The information recording medium having an air sandwich construction has a perspective view as shown in FIG. 1 and has a cross-sectional view as shown in FIG. 2.

That is, the two disc substrates 21a and 21b are provided with subbing layers 22a and 22b, and recording layers 23a and 23b, respectively. The two substrates are engaged and supported by an inner annular spacer 25 and an outer annular spacer 27 through adhesive layers 24a, 24b, 26a, and 26b. Thus, a sealed space (air cavity) 28 is formed by the two substrates 21a and 21b, together with the inner and outer spacers 25 and 27.

A substrate of the present invention can be optionally selected from those materials which are commonly used for information recording medium. However, in view of optical properties, flatness, molding properties, handling properties, stabilities with time passage and manufacturing costs, preferred materials for substrates include glass, such as tempered glass or non-tempered glass; an acrylic resin, such as cellcast polymethyl methacrylate or injection-molded polymethyl methacrylate; vinyl chloride type resin, such as polyvinyl chloride or copolymer of vinyl chloride; and polycarbonate. Of these materials, preferred materials are glass, polycarbonate, polyvinyl chloride and an acrylic resin, from the viewpoint of writing and/or reading information.

Materials for a recording layer include metals such as Te, Zn, In, Sn, Zr, Al, Ti, Cu, Au and Pt; semi-metals such as LBi, As, and Sb; semiconductors such as Ge and Si; alloys of the foregoing metals; and combinations thereof. Sulfides, oxides, boron compounds, carbides, silicates or nitrides of those metals, semi-metals or semiconductors and a mixture of these compounds and metals can also be used as a material for a recording layer. These materials are described in U.S. Pat. Nos. 4,388,400, 4,271,256, 4,415,650 and 4,237,468. Alternatively, combinations of dyestuffs and polymers may be used.

A recording layer can be formed on a substrate direclty or through a subbing layer by a method such as a vacuum evaporation method, a sputtering method or an ion plating method. A recording layer can be a single layer or a multilayer. The thickness thereof is generally in the range of from 100 to 5,500 Å, preferably from 150 to 1,000 Å, in view of optical density required for optical information recording. A recording layer can be provided on both of the substrates, or on only one of the substrates.

In case of an information recording medium used only for playback, fine concave and convex areas corresponding to the information are formed beforehand on one surface of a substrate using a stamper, followed by formation of a layer composed of a reflective substance such as Al or Cu.

A subbing layer underlying a recording layer can be provided on a substrate in order to improve flatness and adhesive strength to a recording layer, to increase sensitivity due to a heat insulating effect, and to prevent quality change of a recording layer.

On the surface of the subbing layer, a pregroove can be provided to secure tracking upon writing and/or reading, as described in Japanese patent publication No. 37922/82.

Materials for forming a subbing layer include, for example, a polymeric substance, such as polymethyl methacrylate, copolymers of acrylic acid and methacrylic acid, copolymers of styrene and maleic anhydride, polyvinyl alcohol, copolymers of N-methylol acrylamide, styrene and vinyl sulfonate, copolymers of styrene and vinyl toluene, chlorinated polyethylene, chlorosulfonated polyethylene, nitrocellulose, polyvinyl chloride, polyester, polyimide, copolymers of vinyl acetate and vinyl chloride, copolymers of ethylene and vinyl acetate, polyethylene, polypropylene, and polycarbonate.

A resin hardened by radiation such as cross-linkable acrylate compositions as described in Japanese patent application (OPI) No. 17837/84 can also be used for the subbing layer.

A subbing layer can be formed by dissolving or dispersing the above-described polymeric substance in a solvent to prepare a coating composition, which is then coated on a substrate by a coating method such as a spin coating method, a dip coating method, an extrusion coating method, a bar coating method, or a screen printing method.

Alternatively, a subbing layer is formed on a stamper by a coating method such as a spin coating method, a dip coating method, an extrusion coating method, a bar coating method or a screen printing method, a substrate is adhered thereto by a radiation hardenable adhesive agent or a thermoplastic adhesive agent, and then stripped off therefrom to provide a pregrooved substrate.

Alternatively, a subbing layer can be formed by injecting the radiation hardenable resin between a substrate and a stamper, followed by exposure to electron beams or ultraviolet rays.

The thickness of a subbing layer is generally from 0.01 to 100 $\mu$m, and preferably from 0.01 to 10 $\mu$m.

In the case of air sandwich construction, the spacer may be made of a plastic material such as acryl resins, polycarbonate resins and epoxy resins, a metal such as aluminum (or optionally anodically-oxidized aluminum) and stainless steel, or ceramic. In order to improve its adhesivity, the surface of the spacer may optionally be roughened, treated with a silane coupling agent or the like, or subjected to treatment by glow discharge, corona discharge or the like. The spacer is preferably made of a material having the same thermal expansion coefficient and humidity expansion coefficient as that of the substrates used. For example, it is preferred to use a polymethyl methacrylate spacer when a polymethyl methacrylate substrate is used and to use a polycarbonate spacer when a polycarbonate substrate is used.

The ultraviolet-curing epoxy adhesive composition which is used in the present invention contains a light initiator which produces a cationic polymerization initiator upon irradiation with ultraviolet rays and an epoxy compound having two or more epoxy groups per molecule. The ultraviolet-curing epoxy adhesive composition of the present invention can rapidly cure and bond materials upon irradiation with ultraviolet rays. Once cured, the present ultraviolet-curing epoxy adhesive composition can show a high bond strength. Furthermore, the present ultraviolet-curing epoxy adhesive composition results in no deterioration to the recording layer even after aging. The present ultraviolet-curing adhesive composition shows a high bond strength even with cellcast acryl substrate, which is most difficult to bond with an adhesive.

Light initiator which produces a cationic polymerization initiator upon irradiation with ultraviolet rays that may be employed include those described in *UV.EB Curing Technique*, pp. 17–49, edited by Minoru Imoto, published by SOGO GIJUTSU CENTER (1982). Examples of those light intiators include:

(i) diazonium salts such as $Ar^1N_2^\oplus PF_6^\ominus$, $Ar^1N_2^\oplus SbF_6$, $Ar^1N_2^\oplus AsF_6^\ominus$, $(Ar^1N_2^\oplus)_2SnCl_6^\ominus$, $Ar^1N_2^\oplus FeCl_4^\ominus$, $(Ar^1N_2^\oplus)_2BiCl_5^\ominus$, $Ar^1N_2^\oplus SbCl_6^\ominus$, and $Ar^1N_2^\oplus BF_4^\ominus$, wherein $Ar^1$ represents a phenyl group;

(ii) onium salts including phosphonium compounds, e.g.,

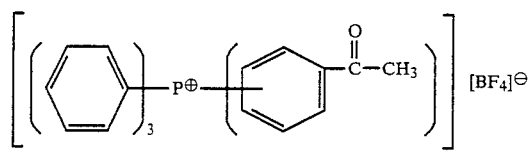

ammonium compounds, e.g.,

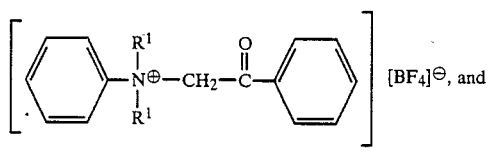

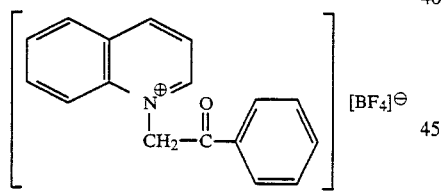

wherein $R^1$ represents a hydrogen atom and an alkyl group have 1 to 10 carbon atoms, iodonium compounds represented by the formula

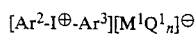

wherein $Ar^2$ and $Ar^3$ are the same or different and each represents a phenyl group, a naphthyl group or a phenyl group substituted with one or more of an alkyl group having 1 to 8 carbon atoms, an alkoxy group having 1 to 4 carbon atoms, a phenoxy group, a halogen atom or a nitro group, or $Ar^2$ and $Ar^3$ bond together to form the chemical structure

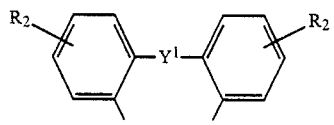

(wherein $Y^1$ represents —O—, —$CH_2$— or —CO— and $R^2$ represents an alkyl group having 1 to 4 carbon atoms, an alkoxy group having 1 to 4 carbon atoms, a halogen atom or a nitro group), $M^1$ represents B, P, As, Sb, Sn, Bi, or Fe, $Q^1$ represents a fluorine atom or a chlorine atom, and n is an integer of 4, 5 or 6, e.g.,

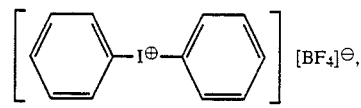

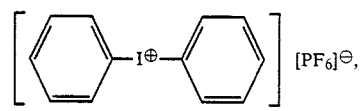

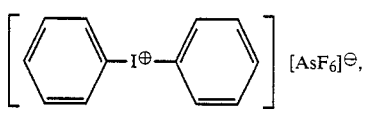

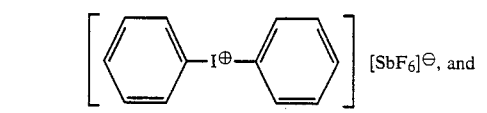

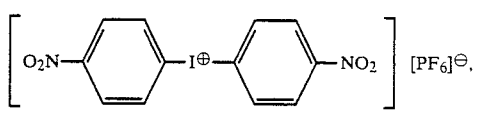

sulfonium compounds such as triarylsulfonium salts, e.g.,

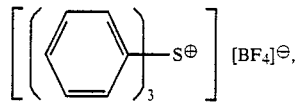

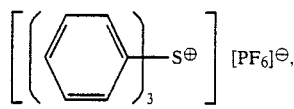

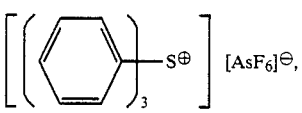

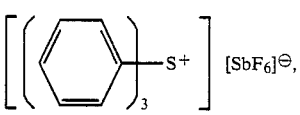

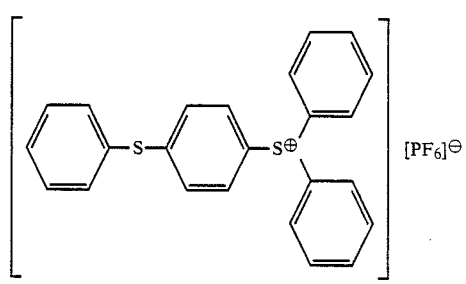

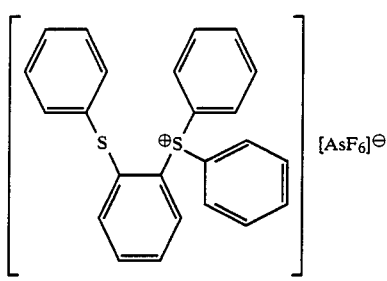
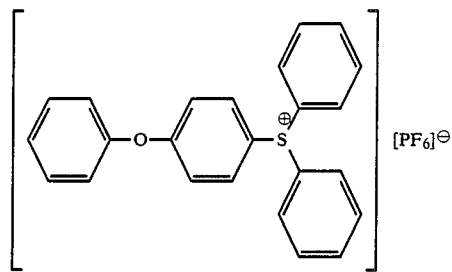
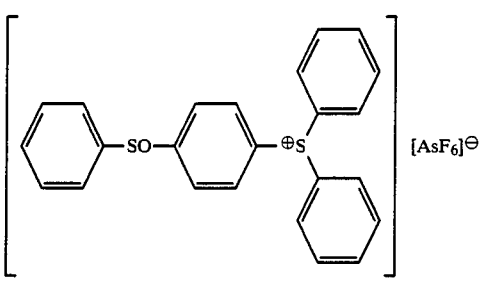
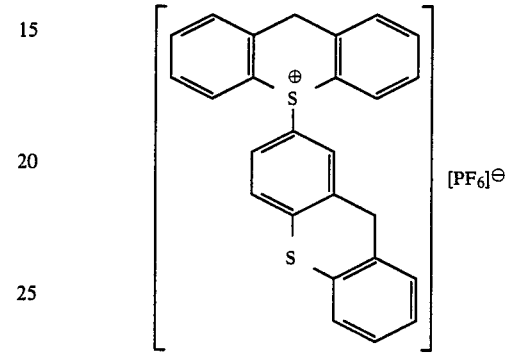
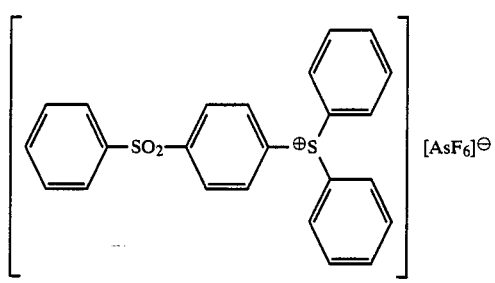
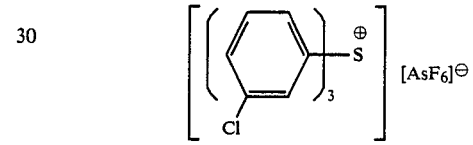
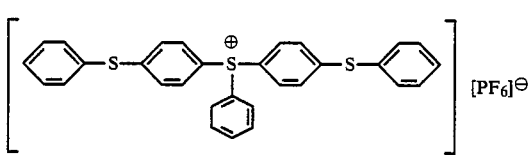
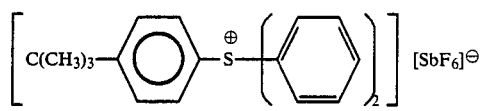
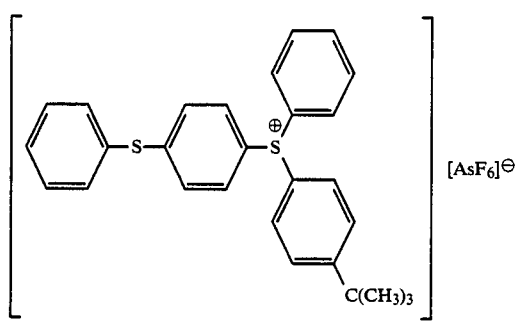
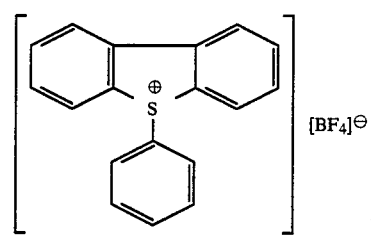
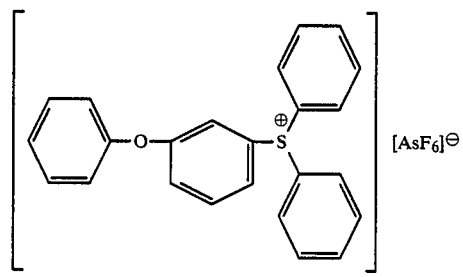
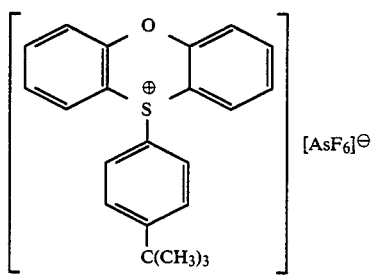

-continued

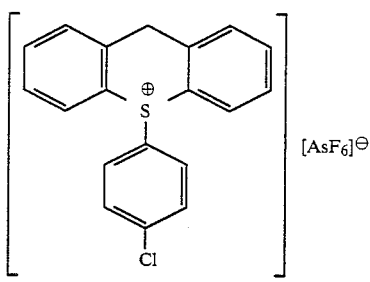

and those represented by the formula

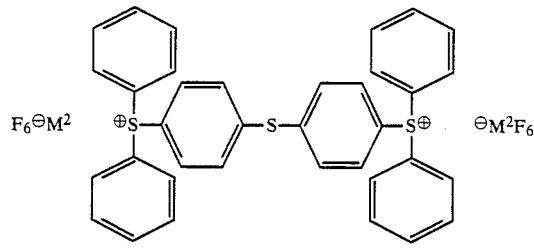

wherein $M^2$ represents P, Sb or As, as well as arsonium compounds, stibonium compounds, oxonium compounds, selenonium compounds, and stannonium compounds;

(iii) Thiopyrylium salts such as

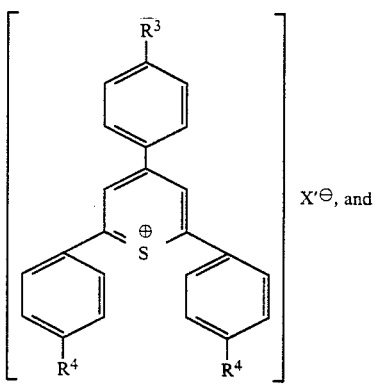

wherein $R^3$ represents a hydrogen atom, a methoxy group, a nitro group or a chlorine atom, $R^4$ represents a hydrogen atom, a methyl group or a methoxy group, and $X'^{\ominus}$ represents $BF_4^{\ominus}$ or $PF_6^{\ominus}$;

(iv) hydrobenzophenone methane sulfonate esters such as

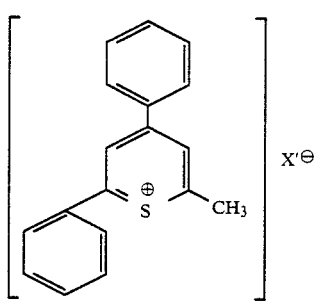

(v) diaryliodosyl salts represented by the formula

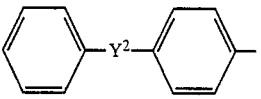

wherein $R^5$ and $R^6$ are the same or different and each represents a thienyl group, a furyl group, a pyridyl group, a pyrazolyl group, an anthryl group, a phenanthryl group, a fluorenyl group, a phenyl group, a naphthyl group or (wherein $Y^2$ represents $-CH_2-$, $-CH_2-CH_2-$, $-C(CH_3)_2-$ or $-O-$), $Z^{i\ominus}$ represents an organic carboxylic or sulfonic acid which may be substituted with one or more halogen atoms, or $M^3Q^2_w{}^{\ominus}$ (wherein $M^3$ represents a metal or a metalloid, $Q^2$ represents a halogen atom and w is an integer of 4 or 6) and i is an integer of 1 or more; and (vi) organic metal complex cations such as ($\eta^3$-cyclopentadienyl)tricarbonyl iron (1+) hexafluorophosphate, ($\eta^5$-cyclopentadienyl)dicarbonylthiocarbonyl iron (1+) tetrafluoroborate, ($\eta^5$-cyclopentadienyl)carbonylbis(triphenylstibine) iron (1+) hexafluorophosphate, ($\eta^5$-cyclopentadienyl)-tricarbonyl ruthenium (1+) tetrachloroferrate, ($\eta^5$-cyclopentadienyl)-dicarbonyltriphenylstibine iron (1+) hexafluoroantimonate, ($\eta^5$-methylcyclopentadienyl)dicarbonylnitrosyl manganese (1+) hexafluoroantimonate, ($\eta^5$-methylcyclopentadienyl)($3$-allyl)dicarbonyl manganese (1+) tetrafluoroborate, ($\eta^5$-cyclopentadienyl)tetracarbonyl molybdenum (1+) hexafluorophosphate, ($\eta^5$-pentadienyl)tricarbonyl iron (1+) tetrafluoroborate, ($\eta^5$-cyclohexadienyl)tricarbonyl iron (1+) hexafluoroarsenate, ($\eta^5$-cyclohexadienyl)(ethylidene)carbonyltriphenylphosphine iron (1+) tetrafluoroborate, ($\eta^5$-cyclopentadienyl)(ethoxymethylcarbene)carbonyltriphenyl-phosphine iron (1+) tetrafluoroborate, ($\eta^5$-cyclopentadienyl)(dithiomethoxycarbene)dicarbonyl iron (1+) hexafluorophosphate, ($\eta^5$-cyclopentadienyl)-dicarbonylmethylisonitrile iron (1+) hexafluoroarsenate, bis($\eta^5$-cyclopentadienyl)($\eta^2$-ethylene)($\delta$-methyl) tungusten (1+) hexafluorophosphate, ($\eta^6$-toluene)-tricarbonyl manganese (1+) hexafluoroantimonate, ($\eta^6$-mesitylene)tricarbonium rhenium (1+) hexafluoroantimonate, ($\eta^7$-cycloheptatrienyl)tricarbonyl chromium (1+) hexafluorophosphate, (η⁷-cycloheptatrienyl)tricarbonyl tungusten (1+) hexafluoroarsenate, (η⁵-cyclopentadienyl)(η²-1-pentene)dicarbonyl iron (1+) tetrafluoroborate, (η⁶-benzene)(η⁵-cyclopentadienyl) iron (1+) hexafluorophosphate, (η⁶-mesitylene)(η⁵-cyclopentadienyl) iron (1+) tetrafluoroborate, (η⁶-naphthalene)(η⁵-cyclopentadienyl) iron (1+) hexafluoroantimonate, (η⁶-acetophenone)(η⁵-methylcyclopentadienyl) iron (1+) hexafluoroarsenate, bis(η⁵-cyclopentadienyl) cobalt (1+) hexafluorophosphate, bis(η⁵-cyclopentadienyl) iron (1+) hexafluoroantimonate, bis(η⁵-chlorocyclopentadienyl) nickel (1+) hexafluorophosphate, bis(η⁶-benzene) chromium (1+) hexafluoroantimonate, bis(η⁶-hexamethylbenzene) cobalt (2+) hexafluoroarsenate, bis(η⁶-hexamethylbenzene) nickel (2+) hexafluoroantimonate, tetracarbonyltriphenylphosphine cobalt (1+) hexafluorophosphate, tricarbonylbis(triphenylphosphine) iridium (1+) hexafluorophosphate, (η³-allyl)pentacarbonyl chromium (1+) tetrafluoroborate, pentacarbonylnitrosyl molybdenum (1+) hexafluorophosphate, (η³-allyl)tetracarbonyl iron (1+) hexafluoroantimonate, hexacarbonyl rhenium (1+) hexafluoroantimonate, bis(η⁶-mesitylene) iron (2+) hexafluoroantimonate, bis(η⁶-hexamethylbenzene) manganese (1+) tetrafluoroborate, trafluoroborate, bis(η⁶-mesitylene) vanadium (1+) hexafluorophosphate, (η⁷-cycloheptatrienyl)(η⁵-cyclopentadienyl) manganese (1+) hexafluoroarsenate, (η⁸-cyclooctatetraenyl)-(η⁵-cyclopentadienyl) chromium (1+) hexafluorophosphate, (η⁶-fluorene)(η⁵-cyclopentadienyl) iron (1+) hexafluorophosphate, (η⁶-1-phenylborabenzene)(η⁵-cyclopentadienyl) cobalt (1+) hexafluorophosphate, (η⁵-cyclopentadienyl)(η⁵-N-methylpyrrolyl) iron (1+) hexafluorophosphate, (η⁶-2,3,4,5-tetrathiomethoxybenzene)(η⁵-cyclopentadienyl) monoiron (1+) hexafluoroarsenate, [(η⁶-1,2,3,4,5,6)(η⁶-7,8,9,10,11,12)biphenyl]bis(η⁵-cyclopentadienyl) diiron (2+) tetrafluoroborate, [(η⁶-1,2,3,4,4a,-9a)(η⁶-5,6,7,8,8a,5a)fluorene]bis(η⁵-cyclopentadienyl) diiron (2+) hexafluorophosphate, [(η⁶-1,2,3,4,4a,9a)(η⁶-5,6,7,8,8a,5a)fluorene]bis(η⁶-benzene) diiron (4+) hexafluorophosphate, [(η⁶-1,2,3,4,4a,12a)(η⁶-7,8,9,10,10a,-6a)chrysene]bis(η⁶-benzene) dichromium (2+) hexafluoroantimonate, dicarbonyl[bis(diphenylphosphino)ethane]bis(cyclopentadienyl) diiron (1+) hexafluorophosphate, tetra[(ηhu 5-cyclopentadienyl)carbonyl iron] (1+) hexafluorophosphate, tris-[(η⁶-benzene)-cobalt]dicarbonyl (1+) hexafluorophosphate, tris(η⁶-cyclopentadienyl) dinickel (1+) hexafluorophosphate, [(η⁶-1,2,29,18c,18b,18a)(η⁶-7,8,8a,18i,18h,-7a)(η⁶-13,14,14a,18o,18n,12a)(η⁶-18t,18u,18v,18w,18x,18y)-tripyreno-(2,1,10,9,8,7-defg-hij:2',1',10',9',8',7'-nopqrst:2'',1'',10'',9'',8'',7''-xyza,b,c,d(trinaphthalene)]tetra(η⁵-cyclopentadienyl) tetrairon (4+) hexafluoroantimonate, [(η⁶-4,5,5a,28c,28b,3a)(η⁶-8a,8b,20d,22a,22b,24c)-1H,1-4H-dipyrano(3,4,5,gh:3',4',5',g'h')anthra(2'',1'',9'':4,5,6;6'',5'',10'':4',5',6')diisoquino(2,1-a:2',1'-a¹)diperimidine]bis(η⁵-cyclopentadienyl) diiron (2+) hexafluoroantimonate, [(η⁶-1,2,3,3a,13b,13a)benzo(10,11)chryseno(2,3-d)(1,3)-dioxozole](η⁵-methylcyclopentadienyl) iron (1+) hexafluorophosphate, [(η⁶-1,2,3,3a,16c,16b)-(η⁶-9,10,11,11a,13c,8b)cyclooc-ta(1,2,3,4,-def:5,6,7,8,-d'e'f')diphenanthrene]bis(η⁵-acetylcyclopentadienyl) diiron (2+) tetrafluoroborate, bis(η⁵-acetylcyclopentadienyl) iron (1+) tetrafluoroborate, [(η⁶-1,2,3,4,4a,42a)(η-⁶-16,17,18,19,19a,15a)(η⁶-30,31,32,32a,32b,29a)naphtho(8',1',2':6,5,10)anthra(2,3-i)naphtho(2''',3''':6''-,7'')indro(2'',3'',5',6')naphtho(2',3':4,5)-indro(2,3-g)naphto(2,3-i')benzo(1,2-a:4,5-a')dicarbazole]tris(η⁵-cyclopentadienyl) triion (3+) hexafluoroantimonate, (η³-1-methyl-allyl)tricarbonyl iron (1+) hexafluorophosphate, (η³-1,3-dimethyl-allyl)tricarbonyl iron (1+) hexachloroantimonate, [(η⁵-cyclopentadienyl) nickel nonacarbonyl tricobalt] (1+) hexafluorophosphate, di-(µ-carbonyltricarbonyl)(dicarbonyl iron)(hexacarbonylhydro diruthenium)-µ-hydro-osmium(2Fe-Ru)(Fe-Os)(2Os-Ru)(Ru-Ru) (1+) hexafluorophosphate, tetra-µ-hydrotetrabis[(1,2,3,4,5-η)-1,2,3,4,5-pentamethyl-2,4-cyclopentadienyl-1-yl]-tetra-tetrahedrorhodium-(2+) bis(hexafluorophosphate), bis(µ-diphenylphosphido-µ-carbonyl-π-methylcyclopentadienyl-carbonyl iron) rhodium (2Rh-Fe) (1+) hexafluorophosphate, di-µ-carbonylpentacarbonyl-µ-carbonyldi-π-cyclopentadienyldirhodio) diiron (Fe-Fe)(4Fe-Rh)(Rh-Rh) (1+) hexafluoroarsenate, and di-µ3-carbonyltricarbonylbis(π-cyclopentadienylnickelio) iron (2Fe-Ni) (1+) hexafluoroantimonate.

These light initiators may optionally be used in combination. In order to promote polymerization reaction, these light initiators may be used in combination with a sensitizer having an absorption wavelength of from 300 to 500 nm, and preferably from 300 to 450 nm. Examples of such a sensitizer include anthracene, benzophenone, pyrene, thioxanthone, and phenothiazine. The addition of these sensitizers are useful particularly when glass is used as the substrate.

Epoxy compounds having two or more epoxy groups per molecule that may be employed include those described in *Epoxy Resin*, pp. 13–53, edited by Kuniyuki Hashimoto, published by Nikkan Kogyo Shinbunsha (1973). Examples of those epoxy compound include the following compounds:

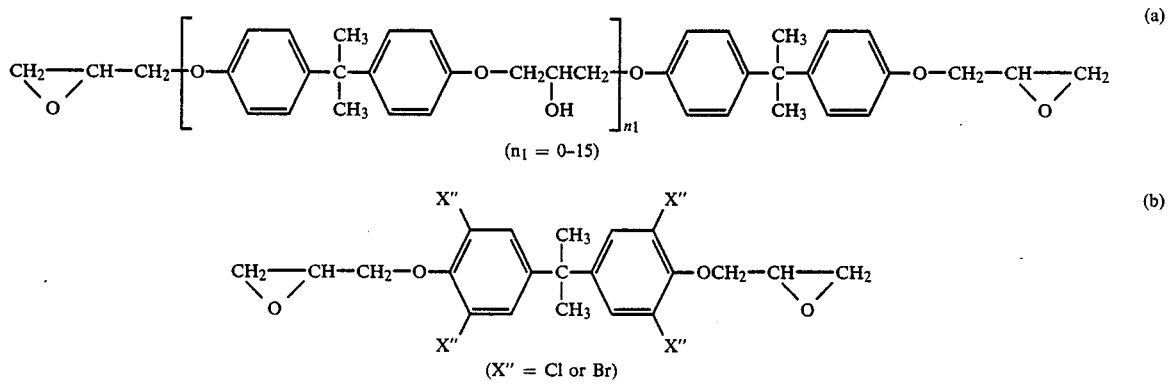

-continued
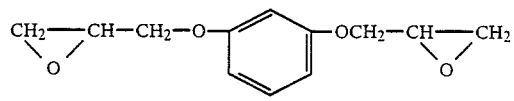 (c)
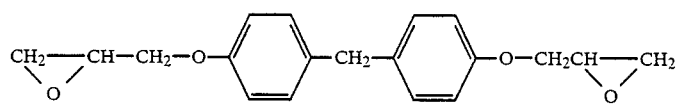 (d)
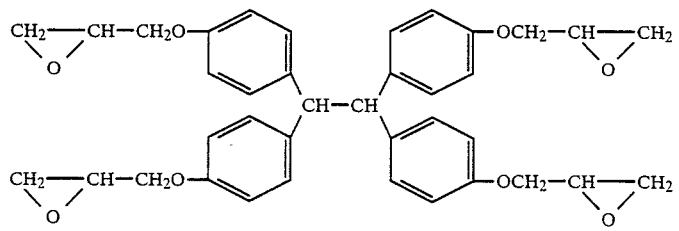 (e)
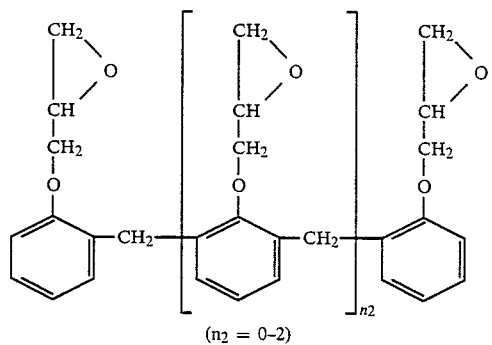 (f)
($n_2 = 0-2$)
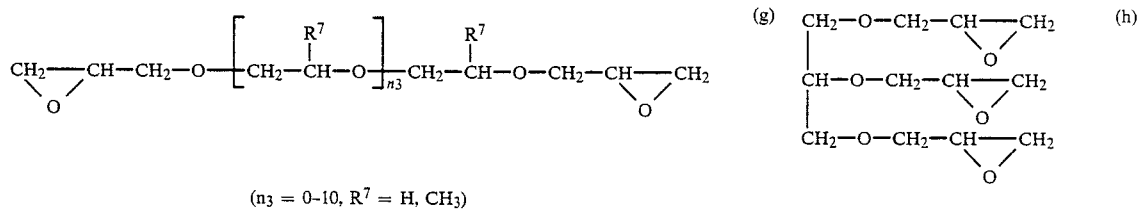 (g)
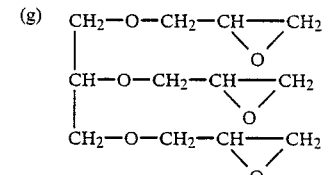 (h)
($n_3 = 0-10$, $R^7 =$ H, CH$_3$)
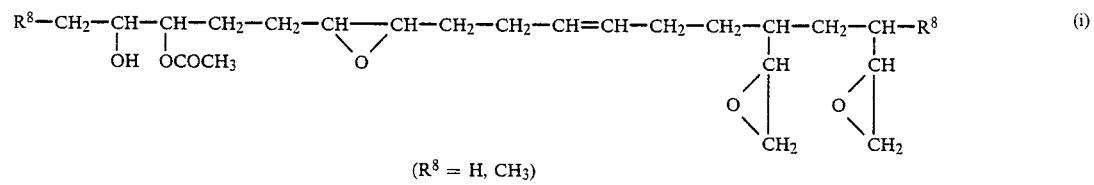 (i)
($R^8 =$ H, CH$_3$)
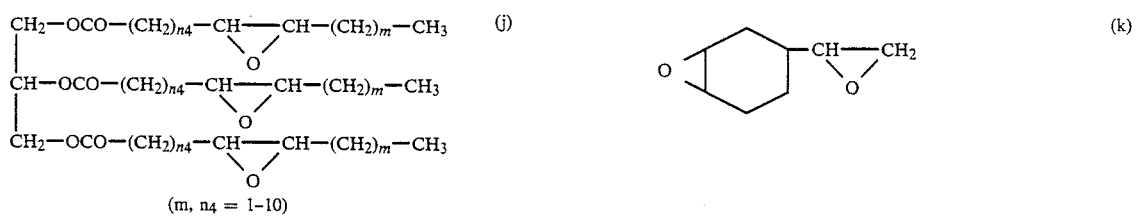 (j)
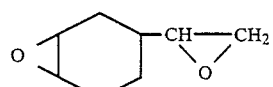 (k)
($m, n_4 = 1-10$)
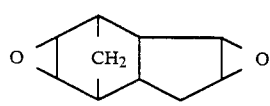 (l)
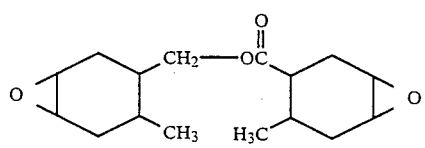 (m)

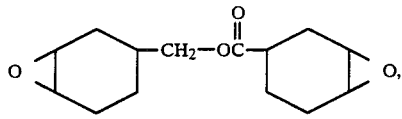

and (o) fatty acid esters of (a), provided that $n_1$ is 1 or more.

These epoxy compounds may optionally be used in combination.

The weight mixing ratio of the light initiator to the epoxy compound is preferably within the range of from 0.0001/1 to 0.1/1. If the mixing ratio of the light initiator to the epoxy compound is 0.0001/1 or less, the curing rate tends to be too low. On the contrary, if the mixing ratio exceeds the above range, the cohesive force of the adhesive layer is reduced.

The present adhesive composition may contain other additives in order to lower its viscosity. Examples of these additives include reactive diluents such as glycidyl ester of tert-carboxylic acid, phenyl glycidyl ether, n-butyl glycidyl ether, allyl glycidyl ether and glycerine type epoxy resin, and unreactive diluents such as xylene, dibutyl phthalate, dioctyl phthalate and tricresyl phosphate. The amount of such diluent added is preferably 30% by weight or less based on the weight of the epoxy compound. If the amount of the diluent exceeds this value, the physical properties of the adhesive layer is deteriorated.

In order to reduce the cost, lower the linear expansion coefficient, the cure shrinkage, and the curing exotherm, and improve the adhesivity, the present adhesive composition may contain a filler added thereto. As a situable filler there may be employed silica, calcium carbonate, mica, asbestos, glass chips, powdered quartz, graphite, alumina, silica gel, aluminum, iron, copper, antimony oxide, barium titanate, or barium sulfide. However, if the amount of the filler added is too large, the transmission of ultraviolet rays is reduced, causing an insufficient curing. Accordingly, the amount of the filler depends on the type thereof. The filler is preferably mixed with the adhesive composition in a proper amount such that a sufficient curing can be accomplished.

Furthermore, the present adhesive composition may contain a dye, a resin modifying material or the like.

The surface of the substrate to be adhered may optionally be subjected to a surface treatment with silane coupling agent or other surface treating agents, a discharge treatment such as glow discharge and corona discharge, or a roughening treatment such a with sandpaper in order to improve its adhesivity.

If a still higher adhesivity is required, for example, when substrates or spacers which are greatly different from each other in linear expansion coefficient are used, a curing agent commonly used for epoxy adhesives such as organic polyamines, organic acids, amino resins, phenol resins, etc. may be added to the adhesive composition of the present invention. In order to promote curing, a heating treatment may be used. However, this heating process requires that the disc have a special construction to prevent deformation due to heat. Therefore, curing should be preferably carried out at room temperature. In this case, aliphatic amines, polyamine resins, or the like are preferably employed as the curing agent.

The disc assembled with an ultraviolet-curing epoxy adhesive composition of the present invention may be further provided with a sealing agent. Sealing agents that may be used include organic materials such as epoxy resins and silicone resins and inorganic materials such as $SiO_2$. The use of such a sealing agent can further inhibit the deterioration of the recording layer in the disc.

The present invention is further illustrated in the following examples, but the present invention should not be construed as being limited thereto.

EXAMPLE 1

A 2% styrene-maleic anhydride copolymer solution (1/1 (volume ratio) solution of methyl ethyl ketone and methyl Cellosolve acetate) was applied to the entire surface of one side of two sheets of disc-substrate having an outer diameter of 305 mm, an inner diameter of 35 mm and a thickness of 1.3 mm by a spinner having a rotational speed of 1,000 rpm. The resulting coat was then dried at 120° C. for 5 minutes to form a subbing layer of 0.2 μm thickness.

A 2% polymethyl methacrylate solution (4/1 (volume ratio) solution of toluene and methyl Cellosolve) was applied on the subbing layer thus formed by a spinner in the same manner as above. The resulting coat was then dried to form a heat insulation layer of 0.2 μm thickness.

In and GeS were simultaneously deposited on the heat insulation layer thus formed in a volume ratio of 1/1 by a vacuum evaporation process to form a recording layer of 300 Å thickness thereon.

The adhered surface of a ring-shaped outer Al spacer (outer diameter: 305 mm; inner diameter: 295 mm) and inner Al spacer (outer diameter: 160 mm; inner diameter: 35 mm) which had been anodically oxidized were provided with a silane coupling agent and further provided with a 50 μm thick ultraviolet-curing epoxy adhesive layer of Composition I as shown below by a transfer printing process. The above two substrates were then assembled with the above spacers interposed therebetween and the recording layer positioned inside in an atmosphere of nitrogen. Both sides of the two substrates thus assembled were then irradiated with ultraviolet rays emitted from two 1-kW high voltage mercury vapor lamps which were positioned at a distance of 50 cm therefrom for 1 minute to obtain an air sandwich construction type optical information recording medium.

Composition I $C_6H_5N_2^{\oplus}BF_4^{\ominus}$   1 wt %

-continued

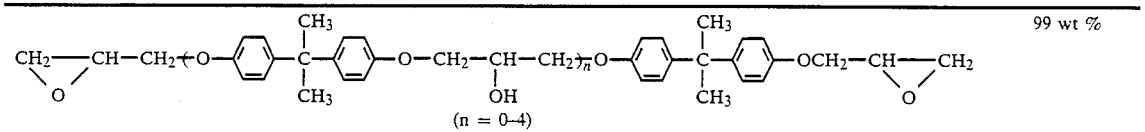

COMPARATIVE EXAMPLE 1

An optical information recording medium was obtained in the same manner as used in Example 1 except in that Composition I was replaced by Composition II shown below.

Composition II

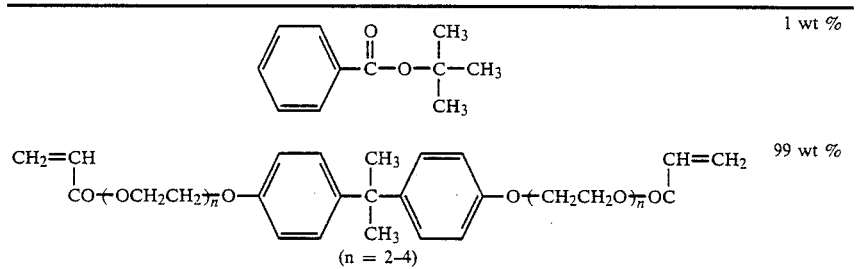

COMPARATIVE EXAMPLE 2

An optical information recording medium was obtained in the same manner as used in Example 1 except in that Composition I was replaced by Composition III. It took two days to obtain an adhesivity high enough for practical use.—

Composition III

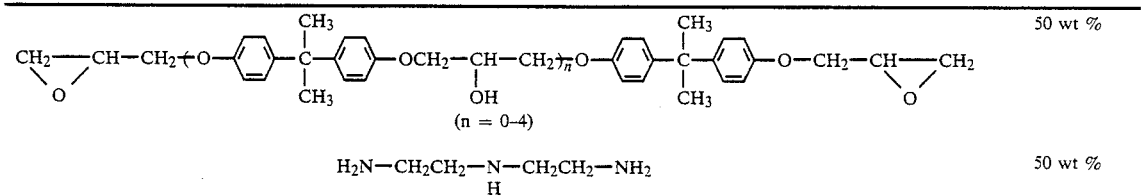

These three optical information recording media were subjected to an endurance test at a temperature of 60° C. and a relative humidity of 90%. Thereafter, these specimens were observed to determine of the bonded areas were peeled off and if the recording layer was deteriorated.

The observation of deterioration of the recording layer was accomplished by observing uneven reflection from the recording layer through a 100-power microscope. The results are shown in the table below.

TABLE

| Sample | Separation of bonded areas | Deterioration of recording layer |
|---|---|---|
| Example 1 | None after 30 days | None after 30 days |
| Comparative Example 1 | Observed after 3 days | None after 30 days |
| Comparative Example 2 | None after 30 days | Observed after 3 days |

While the invention has been described in detail and with reference to specific embodiments thereof, it will be apparent to one skilled in the art that various changes and modifications can be made therein without departing from the spirit and scope thereof.

What is claimed is:

1. An optical information recording medium comprising two disc substrates, which are adhered directly or through a convex portion formed on at least one of the substrates or a spacer provided between the substrates by an adhesive layer, and a recording layer which is capable of recording and/or reading information by laser beam and which is provided on a surface of at least one of the substrates facing the other substrate, wherein the adhesive layer comprises an ultraviolet-curing epoxy adhesive composition comprising a light-initiator which produces a cationic polymerization initiator upon irradiation with ultraviolet rays and an epoxy compound having two or more epoxy groups per molecule.

2. An optical information recording medium as in claim 1, wherein said light initiator is a diazonium salt.

3. An optical information recording medium as in claim 1, wherein said light initiator is an onium salt.

4. An optical information recording medium as in claim 1, wherein said light initiator is a thiopyrylium salt.

5. An optical information recording medium as in claim 1, wherein said light initiator is a hydroxybenzophenone methane sulfonate ester.

6. An optical information recording medium as in claim 1, wherein said light initiator is a diaryliodosyl salt.

7. An optical information recording medium as in claim 1, wherein said light initiator is an organic metal complex cation.

8. An optical information recording medium as in claim 1, wherein said spacers are made of a material having the same thermal expansion coefficient and humidity expansion coefficient as that of the substrates.

9. An optical information recording medium as in claim 1, wherein said recording layer has a thickness of from 150 to 1,000 Å.

10. An optical information recording medium as in claim 1, wherein a subbing layer is present between the inner surface of the substrate and the recording layer.

11. An optical information recording medium as in claim 10, wherein the subbing layer has a thickness within the range of from 0.01 to 10 μm.

12. An optical information recording medium as in claim 1, wherein said adhesive composition further comprises a sensitizer.

13. An optical information recording medium as in claim 12, wherein said sensitizer has an absorption wavelength of from 300 to 450 nm.

14. An optical information recording medium as in claim 1, wherein the weight mixing ratio of the light initiator to the epoxy compound is within the range of from 0.0001/1 to 0.1/1.

15. An optical information recording medium as in claim 12, wherein said sensitizer is selected from the group consisting of anthracene, benzophenone, pyrene, thioxanthone, and phenothiazine.

* * * * *